United States Patent
Numata

(10) Patent No.: US 12,520,058 B2
(45) Date of Patent: Jan. 6, 2026

(54) PHOTOELECTRIC CONVERSION APPARATUS, METHOD FOR CONTROLLING PHOTOELECTRIC CONVERSION APPARATUS, AND STORAGE MEDIUM

(71) Applicant: CANON KABUSHIKI KAISHA, Tokyo (JP)

(72) Inventor: Aihiko Numata, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 115 days.

(21) Appl. No.: 18/488,840

(22) Filed: Oct. 17, 2023

(65) Prior Publication Data
US 2024/0163577 A1    May 16, 2024

(30) Foreign Application Priority Data
Oct. 27, 2022 (JP) .................................. 2022-172619

(51) Int. Cl.
*H04N 25/625*    (2023.01)
(52) U.S. Cl.
CPC ................................ *H04N 25/625* (2023.01)
(58) Field of Classification Search
CPC ..................................................... H04N 25/625
USPC ........................................................ 348/248
See application file for complete search history.

(56) References Cited

U.S. PATENT DOCUMENTS

2007/0194249 A1   8/2007   Gavrilov
2016/0309102 A1*   10/2016   Koizumi .............. H04N 25/704
2018/0275252 A1*   9/2018   Fried ...................... G01S 17/04

OTHER PUBLICATIONS

Quan Chau, et al.; "Analysis and Modeling of Optical Crosstalk in InP-based Geiger-mode Avalanche Photodiode FPAs"; Proc. SPIE vol. 9492, Advanced Photon Counting Techniques IX; May 13, 2015; XP060053061; pp. 94920O-1-94920O-12.
Rech et al.; "Optical crosstalk in single photon avalanche diode arrays: a new complete model;" Jun. 9, 2008 / vol. 16, No. 12 / Optics Express 8381; © 2008 Optical Society of America; pp. 1-14.

* cited by examiner

*Primary Examiner* — Joel W Fosselman
(74) *Attorney, Agent, or Firm* — Canon U.S.A., Inc. IP Division

(57) ABSTRACT

A photoelectric conversion apparatus includes a photoelectric conversion element including a pixel area where a plurality of pixels composed of avalanche photodiodes for photoelectrically converting an optical image is two-dimensionally arranged, the photoelectric conversion element being configured to simultaneously read signals from a first pixel group and a second pixel group in the pixel area, at least one processor, and a memory coupled to the at least one processor, the memory storing instructions that, when executed by the at least one processor, cause the at least one processor to generate an image based on the read signals, acquire characteristic information regarding crosstalk between the plurality of pixels, generate correction information based on the characteristic information, and perform a correction process on the image using the correction information. Correction information different between the first and second pixel groups is generated.

15 Claims, 19 Drawing Sheets

FIG. 8A

| 0% | 0% | 0.2% | 0% | 0% |
|---|---|---|---|---|
| 0% | 0% | 1% | 0.4% | 0% |
| 0% | 0% |  | 1% | 0.2% |
| 0% | 0% | 1% | 0.4% | 0% |
| 0% | 0% | 0.2% | 0% | 0% |

FIG. 8B

| 0% | 0% | 0.2% | 0% | 0% |
|---|---|---|---|---|
| 0% | 0.4% | 1% | 0.4% | 0% |
| 0% | 1% |  | 1% | 0.2% |
| 0% | 0.4% | 1% | 0.4% | 0% |
| 0% | 0% | 0.2% | 0% | 0% |

FIG. 8C

| 0% | 0% | 0.2% | 0% | 0% |
|---|---|---|---|---|
| 0% | 0.4% | 1% | 0.4% | 0% |
| 0.2% | 1% |  | 1% | 0.2% |
| 0% | 0.4% | 1% | 0.4% | 0% |
| 0% | 0% | 0.2% | 0% | 0% |

FIG. 8D

| 0% | 0% | 0.2% | 0% | 0% |
|---|---|---|---|---|
| 0% | 0.4% | 1% | 0.4% | 0% |
| 0.2% | 1% |  | 1% | 0.2% |
| 0% | 0.4% | 1% | 0.4% | 0% |
| 0% | 0% | 0.2% | 0% | 0% |

FIG. 8E

| 0% | 0% | 0.2% | 0% | 0% |
|---|---|---|---|---|
| 0% | 0.4% | 1% | 0.4% | 0% |
| 0.2% | 1% |  | 1% | 0% |
| 0% | 0.4% | 1% | 0.4% | 0% |
| 0% | 0% | 0.2% | 0% | 0% |

FIG. 8F

| 0% | 0% | 0.2% | 0% | 0% |
|---|---|---|---|---|
| 0% | 0.4% | 1% | 0% | 0% |
| 0.2% | 1% |  | 0% | 0% |
| 0% | 0.4% | 1% | 0% | 0% |
| 0% | 0% | 0.2% | 0% | 0% |

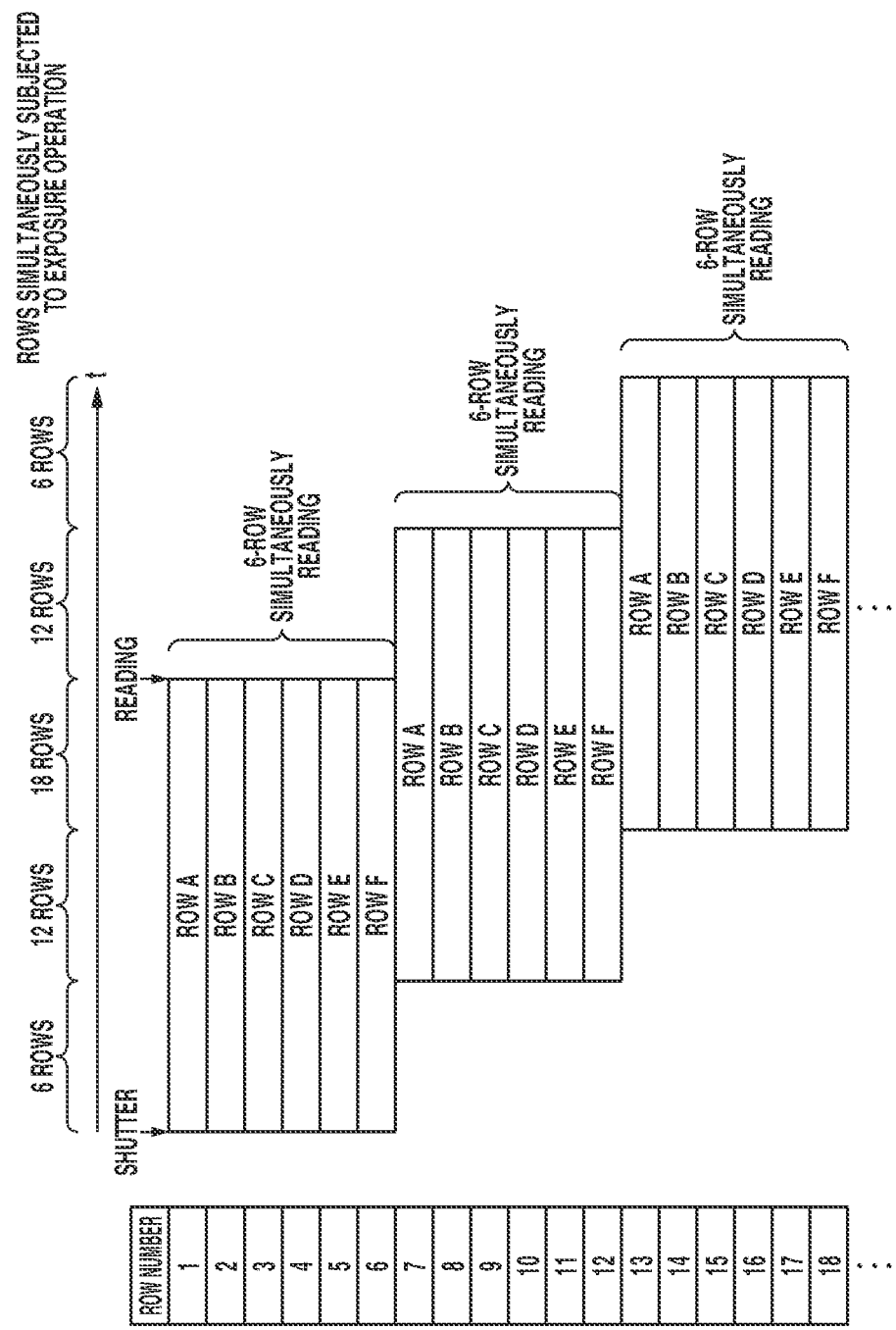

PHOTOELECTRIC CONVERSION APPARATUS, METHOD FOR CONTROLLING PHOTOELECTRIC CONVERSION APPARATUS, AND STORAGE MEDIUM

This application claims the benefit of Japanese Patent Application No. 2022-172619, filed Oct. 27, 2022, which is hereby incorporated by reference herein in its entirety.

BACKGROUND OF THE INVENTION

Field of the Invention

The present invention relates to a photoelectric conversion apparatus.

Description of the Related Art

In recent years, there has been discussed a photoelectric conversion apparatus that digitally counts the number of photons reaching an avalanche photodiode (APD) and outputs the counted value as a photoelectrically converted digital signal from a pixel.

I. Rech et al., "Optical crosstalk in single photon avalanche diode arrays: a new complete model", OpEx 16 (12), 2008 shows that a phenomenon termed avalanche light emission occurs in a photoelectric conversion apparatus including an APD (non-patent literature 1). When avalanche light emission occurs, a generated secondary electron is incident on an adjacent pixel, increasing the number of counts of the value of the adjacent pixel, causing an incorrect count.

SUMMARY OF THE INVENTION

According to an aspect of the present invention, a photoelectric conversion apparatus includes a photoelectric conversion element including a pixel area where a plurality of pixels composed of avalanche photodiodes for photoelectrically converting an optical image is two-dimensionally arranged, the photoelectric conversion element being configured to simultaneously read signals from a first pixel group and a second pixel group in the pixel area, at least one processor, and a memory coupled to the at least one processor, the memory storing instructions that, when executed by the at least one processor, cause the at least one processor to generate an image based on the read signals, acquire characteristic information regarding crosstalk between the plurality of pixels, generate correction information based on the characteristic information, and perform a correction process on the image using the correction information. Correction information different between the first and second pixel groups is generated.

Further features of the present invention will become apparent from the following description of exemplary embodiments with reference to the attached drawings.

BRIEF DESCRIPTION OF THE DRAWINGS

FIGS. 8A to 8F illustrate a probability distribution of occurrence of an incorrect count between adjacent pixels in the photoelectric conversion element as first array data.

FIGS. 13A and 13B are timing charts in a case where the length of an exposure time changes.

DESCRIPTION OF THE EMBODIMENTS

Exemplary embodiments for carrying out the present invention will be described in detail below, but the present invention is not limited to the following exemplary embodiments. In all the drawings, like numbers refer to like components having the same functions, and descriptions thereof are not repeatedly described.

Figure 1:
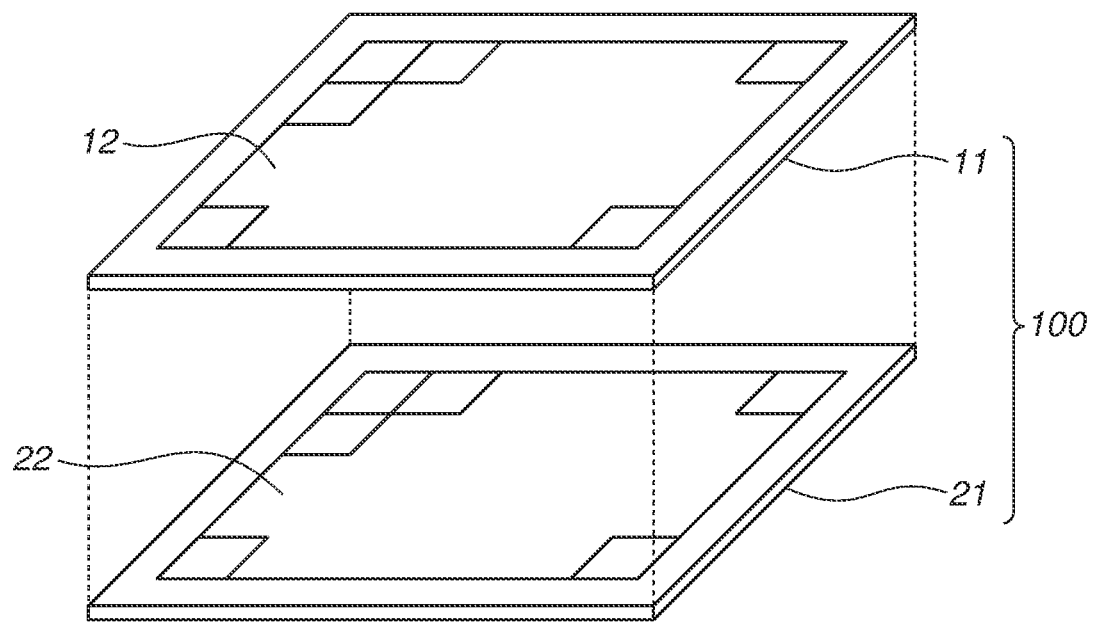
FIG. 1 illustrates an example of the configuration of a photoelectric conversion element.

A first exemplary embodiment will be described. FIG. 1 illustrates an example of the configuration of a photoelectric conversion element. The following is a description of as an example of a photoelectric conversion apparatus in which a photoelectric conversion element 100 has a so-called laminated structure formed by laminating and electrically connecting two substrates, namely a sensor substrate 11 and a circuit substrate 21. The photoelectric conversion element 100 may have a so-called non-laminated structure where components included in a sensor substrate and components included in a circuit substrate are disposed on a common semiconductor layer. The sensor substrate 11 includes a pixel area 12. The circuit substrate 21 includes a circuit area 22 that processes a signal detected in the pixel area 12.

<Sensor Substrate>

Figure 2:
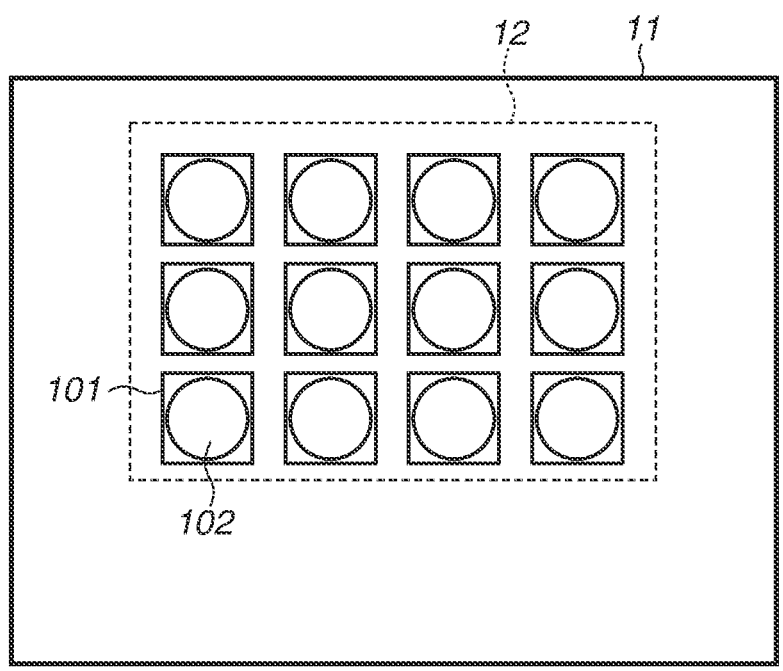
FIG. 2 illustrates an example of the configuration of a sensor substrate.

FIG. 2 illustrates a configuration example of the sensor substrate 11. The pixel area 12 of the sensor substrate 11 includes a plurality of pixels 101 two-dimensionally arranged in a plurality of rows and columns (a row direction and a column direction). Each pixel 101 includes a photoelectric conversion unit 102 including an avalanche photodiode (hereinafter, "APD"). The number of rows and the number of columns of the pixel array forming the pixel area 12 are not particularly limited.

<Circuit Substrate>

Figure 3:
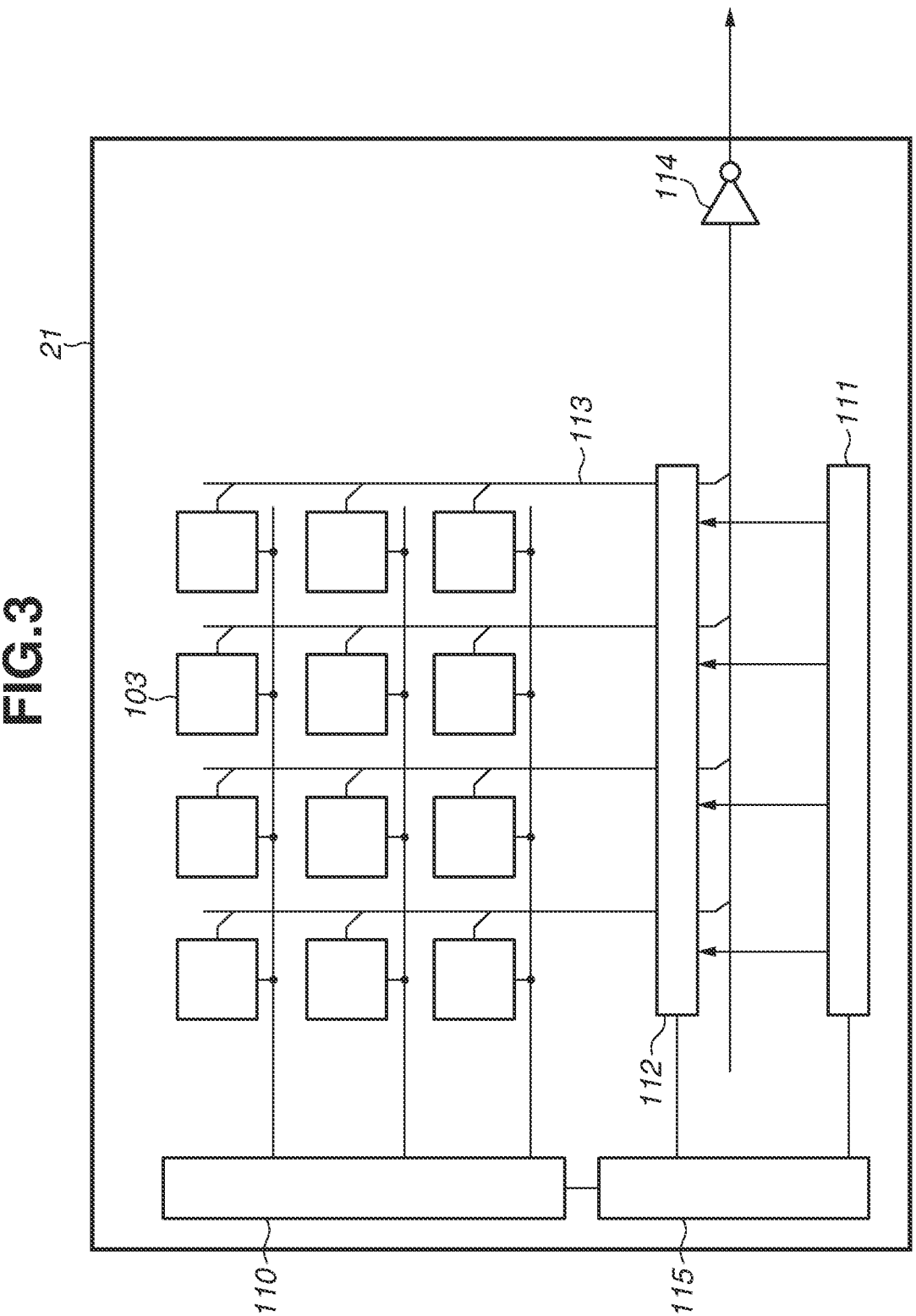
FIG. 3 illustrates an example of the configuration of a circuit substrate.

FIG. 3 illustrates a configuration example of the circuit substrate 21. The circuit substrate 21 includes signal processing circuits 103 that process charges photoelectrically converted by the photoelectric conversion units 102 in FIG. 2, a reading circuit 112, a control pulse generation unit 115, a horizontal scanning circuit 111, signal lines 113, and a vertical scanning circuit 110.

Signals output from the photoelectric conversion units 102 of the pixels 101 are processed by the signal processing circuits 103. Each signal processing circuit 103 includes a counter and a memory. The memory holds a digital value.

To read signals from memories of the pixels 101 holding digital signals, the horizontal scanning circuit 111 inputs control pulses for sequentially selecting columns to the signal processing circuits 103.

Signals are output to the corresponding signal line 113 from the signal processing circuits 103 corresponding to the pixels 101 selected by the vertical scanning circuit unit 110 in a selected column. The signals output to the signal line 113 are output to outside the photoelectric conversion element 100 via an output circuit 114.

<Connection Between Sensor Substrate and Circuit Substrate>

As illustrated in FIGS. 2 and 3, the plurality of signal processing circuits 103 is disposed in an area overlapping the pixel area 12 in a planar view. Then, the vertical scanning circuit unit 110, the horizontal scanning circuit unit 111, the reading circuit 112, the output circuit 114, and the control pulse generation unit 115 are disposed overlapping each other between the edge of the sensor substrate 11 and the edge of the pixel area 12 in the planar view. In other words, the sensor substrate 11 includes the pixel area 12 and a non-pixel area disposed around the pixel area 12. Then, the vertical scanning circuit unit 110, the horizontal scanning circuit unit 111, the reading circuit 112, the output circuit 114, and the control pulse generation unit 115 are disposed in an area overlapping the non-pixel area in the planar view.

<Vertical Scanning Circuit>

The vertical scanning circuit 110 receives a control pulse supplied from the control pulse generation unit 115 and supplies the control pulse to each pixel 101. The vertical scanning circuit 110 includes an address decoder and a shift register connecting a plurality of rows as a single unit, reading a plurality of rows at a time, providing high-speed reading. Particularly, with a photoelectric conversion apparatus that digitally counts the number of photons reaching an APD and outputs the counted value as a photoelectrically converted digital signal from a pixel, it takes time to perform the operation of a counter circuit digitally counting the number of photons. Thus, it is desirable to simultaneously read a plurality of rows for high-speed reading. Specifically, the vertical scanning circuit 110 that functions as a reading circuit that reads a pixel signal from a pixel simultaneously reads pixel signals from pixels included in a first row and pixel signals from pixels included in a second row.

Figure 4:
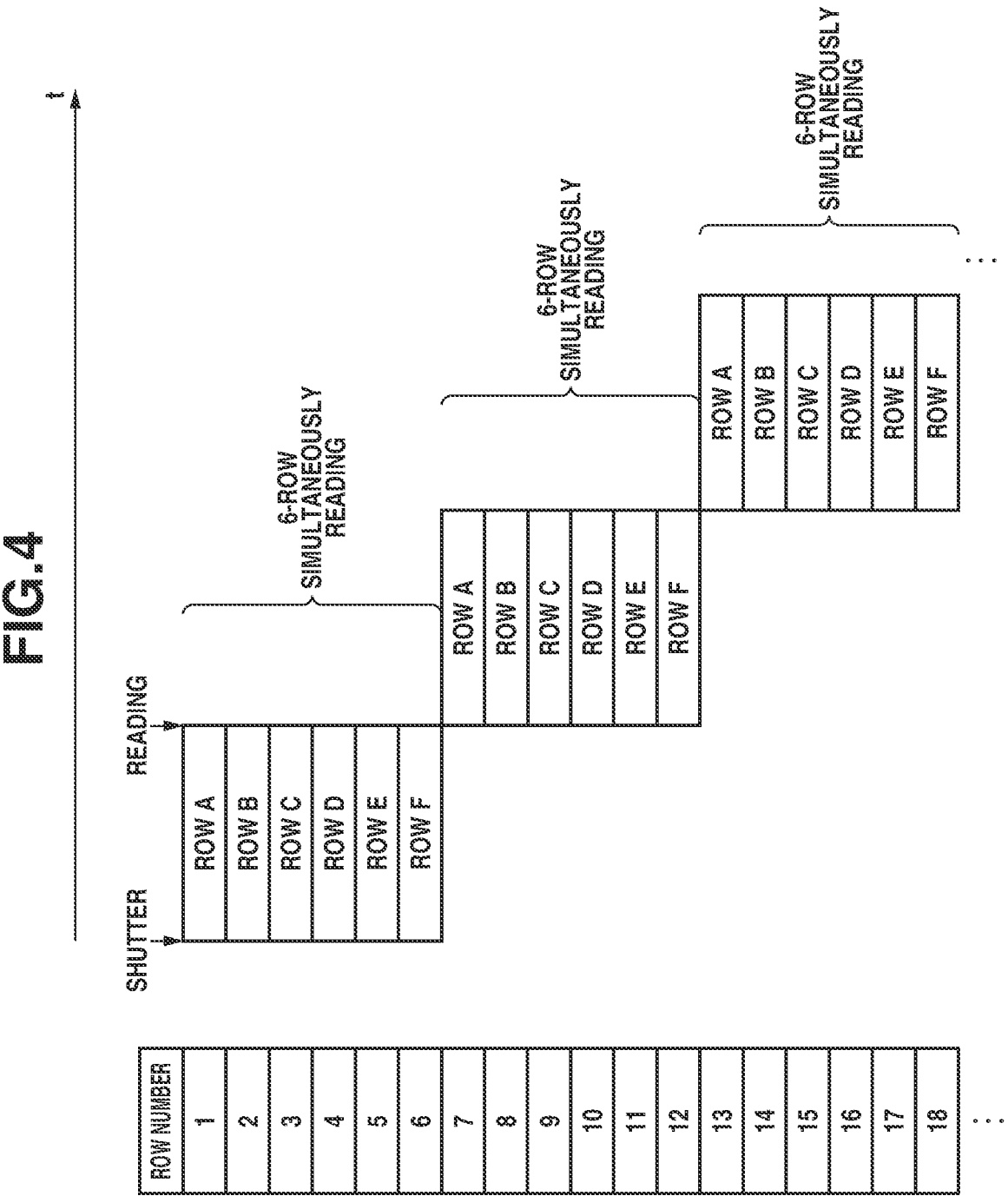
FIG. 4 is a timing chart of a vertical scanning circuit.

FIG. 4 illustrates a timing chart of the vertical scanning circuit 110. In the following description, as illustrated in FIG. 4, rows that are simultaneously read are a single group, and the rows are distinguished based on the positions of the rows in the group and represented as "rows A to F". While FIG. 4 illustrates a case where the number of rows that are simultaneously read is six, the number of rows that are simultaneously read is not limited to six. While FIG. 4 illustrates a case where rows simultaneously subjected to an exposure operation are six rows, with a longer exposure time, the number of rows simultaneously subjected to the exposure operation is the integral multiple of six. The differences based on exposure times will be described below.

The arrangement of the signal lines 113 and the arrangement of the reading circuit 112 and the output circuit 114 are not limited to those illustrated in FIG. 3. For example, with arrangement of the signal lines 113 extending in the row direction, the reading circuit 112 may be disposed at the extension destinations of the signal lines 113. Not all the photoelectric conversion units 102 may have the functions of signal processing units. A configuration may be employed in which a single signal processing unit is shared by a plurality of photoelectric conversion units 102 and sequentially performs signal processing.

<Equivalent Circuit of Pixel>

Figure 5:
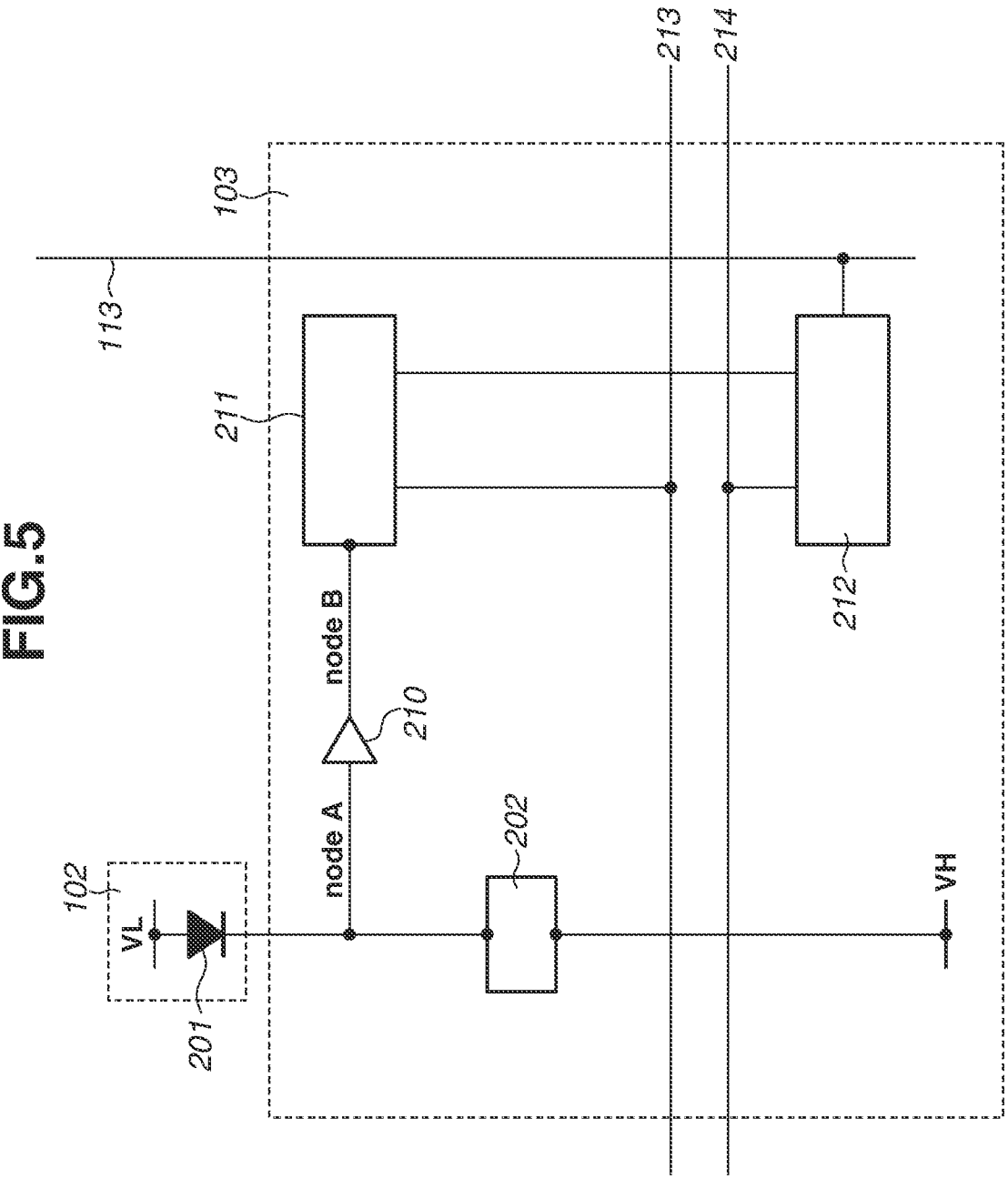
FIG. 5 illustrates an example of an equivalent circuit of a pixel and a signal processing circuit corresponding to the pixel.

FIG. 5 illustrates an equivalent circuit of a pixel 101 and a signal processing circuit 103 corresponding to the pixel 101 in FIGS. 2 and 3.

An APD 201 generates a charge pair according to incident light through photoelectric conversion. One of the two nodes of the APD 201 is connected to a power supply line to which a driving voltage VL (a first voltage) is supplied. The other of the two nodes of the APD 201 is connected to a power supply line to which a driving voltage VH (a second voltage) higher than the voltage VL is supplied. In FIG. 5, one of the nodes of the APD 201 is an anode, and the other of the nodes of the APD 201 is a cathode.

Reverse bias voltages are supplied to the anode and the cathode of the APD 201, and cause the APD 201 to perform an avalanche multiplication operation. The reverse bias voltages supplied to the APD 201 brings about avalanche multiplication with the charges generated by the incident light, producing an avalanche current.

There are a Geiger mode and a linear mode to operate an APD with reverse bias voltages being supplied. The Geiger mode causes an APD to operate with the difference in voltage between the anode and the cathode being greater than its breakdown voltage, and the linear mode causes an APD to operate with the difference in voltage between the anode and the cathode being close to or less than or equal to its breakdown voltage. The APD caused to operate in the Geiger mode is referred to as a "single-photon avalanche diode (SPAD)". With an SPAD, for example, the voltage VL (the first voltage) is −30 V, and the voltage VH (the second voltage) is 1 V.

A quench element 202 is connected to the power supply line to which the driving voltage VH is supplied and to either the anode or the cathode of the APD 201. The quench element 202 functions as a load circuit (a quench circuit) as a signal is multiplied due to avalanche multiplication to reduce a voltage supplied to the APD 201, preventing avalanche multiplication (a quench operation). The quench element 202 also serves to run a current corresponding to the voltage dropped by the quench operation, returning a voltage supplied to the APD 201 to the driving voltage VH (a recharge operation).

FIG. 5 illustrates an example where the signal processing circuit 103 includes a waveform shaping unit 210, a counter circuit 211, and a selection circuit 212 in addition to the quench element 202. The signal processing circuit 103 needs to include at least any one of the waveform shaping unit 210, the counter circuit 211, and the selection circuit 212, in addition to the quench element 202.

The waveform shaping unit 210 shapes a change in the voltage of the cathode of the APD 201 obtained in photon detection into a pulse signal to output. The waveform shaping unit 210, for example, is an inverter circuit. While the example has been illustrated of using a single inverter as the waveform shaping unit 210 in FIG. 5, a circuit where a plurality of inverters is connected in series may be used, or another circuit with a waveform shaping effect may be used.

The counter circuit 211 counts pulse signals output from the waveform shaping unit 210 and holds the count value. If a control pulse RES is supplied to the counter circuit 211 via a driving line 213, the count value of the signals held in the counter circuit 211 is reset.

A control pulse SEL is supplied to the selection circuit 212 from the vertical scanning circuit unit 110 in FIG. 3 via a driving line 214 in FIG. 5 (not illustrated in FIG. 3), switching electrical connection and disconnection between the counter circuit 211 and the signal line 113. The selection circuit 212 includes, for example, a buffer circuit for outputting signals. The selection circuit 212 outputs an output signal from the counter circuit 211 of the pixel 101 to the vertical signal line 113.

A switch, such as a transistor, may be disposed between the quench element 202 and the APD 201 or between the photoelectric conversion unit 102 and the signal processing circuit 103, switching electrical connection. Similarly, the supply of the voltage VH or the voltage VL to the photoelectric conversion unit 102 may be electrically switched using a switch, such as a transistor.

<Driving of Circuit>

Figure 6:
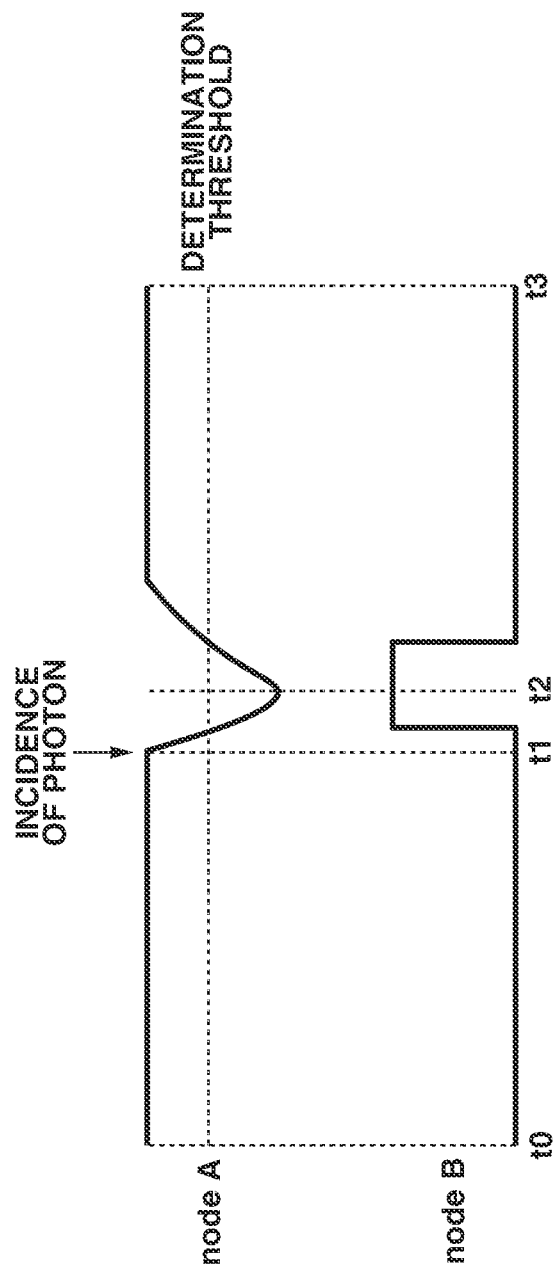
FIG. 6 schematically illustrates a relationship between the operation of an avalanche photodiode (APD) and an output signal.

FIG. 6 schematically illustrates a relationship between the operation of the APD 201 and an output signal. The input side of the waveform shaping unit 210 is a node A, and the output side of the waveform shaping unit 210 is a node B. Between times t0 and t1, the potential difference of VH–VL is applied to the APD 201. At the time t1, with a photon incidence on the APD 201, avalanche multiplication occurs in the APD 201, an avalanche multiplication current flows through the quench element 202, and the voltage of the node A drops. With a greater voltage drop and a smaller potential difference applied to the APD 201, at a time t2, the avalanche multiplication in the APD 201 stops, preventing the voltage level of the node A from not dropping below a certain value. Then, between the time t2 and a time t3, a current that compensates for the voltage drop flows through the node A from the voltage VL. At the time t3, the node A is static at the original potential level. At this time, the portion of the output waveform of the node A that exceeds a certain threshold is waveform-shaped by the waveform shaping unit 210 into a pulse signal to be output at the node B.

A photoelectric conversion apparatus according to each of the exemplary embodiments of the present invention will be described below.

<System Block Diagram>

Figure 7:
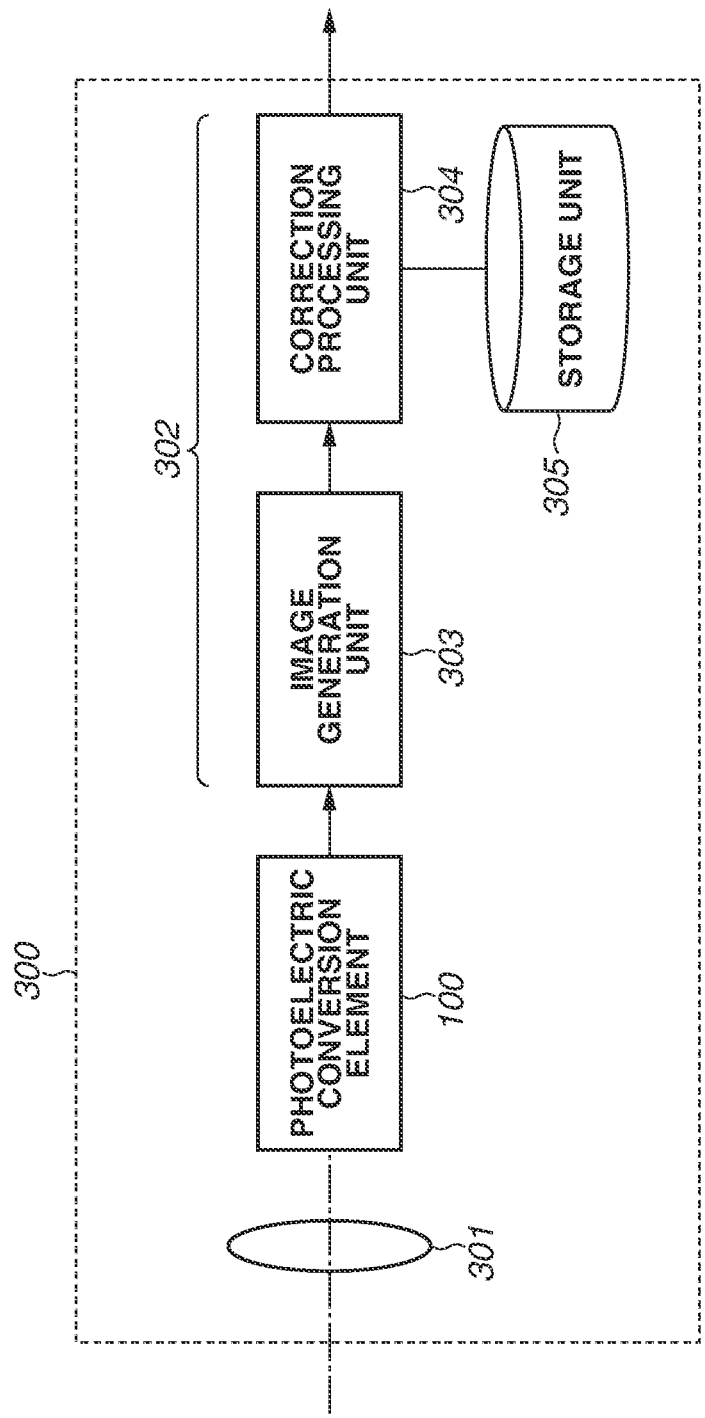
FIG. 7 is a block diagram illustrating an example of the functional configuration of a photoelectric conversion apparatus according to a first exemplary embodiment.

FIG. 7 illustrates a system block diagram of a photoelectric conversion apparatus 300 according to the first exemplary embodiment. The functional blocks illustrated in FIG. 7 are partly implemented by causing a computer (not illustrated) included in the photoelectric conversion apparatus 300 to run a computer program stored in a memory as a storage medium (not illustrated).

Some or all of the functional blocks may be provided of hardware. A dedicated circuit (an application-specific integrated circuit (ASIC)) or a processor (a reconfigurable processor or a digital signal processor (DSP)) can be used as hardware. The functional blocks illustrated in FIG. 7 may not be built into a housing, and each may be a separate apparatus connected to each other via a signal line. The above description regarding FIG. 7 applies to FIG. 18 in a similar way.

The photoelectric conversion apparatus 300 includes the photoelectric conversion element 100 in FIGS. 1 to 6, an image forming optical system 301, and a signal processing unit 302 that processes signals acquired by the photoelectric conversion element 100. The photoelectric conversion element 100 includes avalanche photodiodes for photoelectrically converting an optical image. The avalanche photodiodes form a pixel area where pixels are two-dimensionally arranged. The photoelectric conversion element 100 includes a reading circuit that simultaneously reads signals from pixels included in a first pixel group and signals from pixels included in a second pixel group.

The signal processing unit 302 includes an image generation unit 303 that generates a first image from signals acquired by the photoelectric conversion units 102, a correction processing unit 304, and a storage unit 305 as storage means that stores first array data based on characteristic information regarding the photoelectric conversion element 100.

The characteristic information is information regarding the characteristics of crosstalk between pixels that occurs due to an avalanche light emission phenomenon in the photoelectric conversion element 100. The storage unit 305 may download the characteristic information (the first array data) from an external server and temporarily save the characteristic information (the first array data). The characteristic information is two-dimensional array data including a numerical value indicating the probability of the occurrence with respect to each element.

The correction processing unit 304 performs a first correction process using the first array data based on the characteristic information regarding the photoelectric conversion element 100. The photoelectric conversion element according to the present invention changes the first array data in each row among a plurality of pixel groups that are simultaneously read (the rows A to F in FIG. 4). In other words, at the correction processing unit 304 that functions as correction processing means, the characteristic information used in correction differs between a first row and a second row that are simultaneously read. While the following is a description of an example where reading scanning is performed on each row of the pixel area, the scanning direction may be the column direction. That is, the reading circuit simultaneously reads a plurality of signals from one-dimensionally arranged pixels included in each pixel group (pixel sequence) among pixel groups (pixel sequences) composed of a plurality of pixels in the pixel area. Data in which pixels in a pixel group are one-dimensionally arranged in a predetermined scanning direction is referred to as a "single row". To sum up, correction information used in the correction process differs between the first and second pixel groups. Here, the correction information for each of the first and second pixel groups does not necessarily differ, and different correction information may be used for at least a single pixel group. That is, in the correction process, correction information extracted or converted based on different portions of the characteristic information is used for different pixel groups.

<Array Data>

FIGS. 8A to 8F illustrate the probability distribution of occurrence of an incorrect count between adjacent pixels in the photoelectric conversion element 100 as the first array data and illustrate examples of the first array data corresponding to the characteristic information regarding the photoelectric conversion element 100. FIGS. 8A, 8B, 8C, 8D, 8E, and 8F illustrate pieces of array data used for pixels located in the rows A, B, C, D, E, and F, respectively, as targets of simultaneous reading in FIG. 4. Each piece of array data is two-dimensional array data used by the correction processing unit 304 and stored in the storage unit 305. The storage unit 305 stores basic two-dimensional array data (characteristic information). The correction processing unit 304 as correction processing means performs the correction process on an image using the entirety or a part (the first array data) of the two-dimensional array data. The characteristic information and the first array data (the correction information) corresponding to pixels subject to processing may be stored as a table or saved as functions in the storage unit 305.

As illustrated in non-patent literature 1, with pixels being avalanche photodiodes, an incorrect count between adjacent pixels, i.e., crosstalk between adjacent pixels (hereinafter referred to as "light emission crosstalk"), occurs due to an avalanche light emission phenomenon.

The influence of a photon incidence on a single pixel on an adjacent pixel is determined based on the probability of occurrence of light emission crosstalk. The probability of occurrence of light emission crosstalk is determined based on the pixel structure of the photoelectric conversion element. Thus, the probability of occurrence of light emission crosstalk can be predicted based on the pixel structure of the photoelectric conversion element. The photoelectric conversion apparatus 300 according to the first exemplary embodiment performs signal processing for reducing the influence of an incorrect count using characteristic information related to information regarding the probability of occurrence of light emission crosstalk, providing an improved image quality.

Particularly, the photoelectric conversion element according to the present exemplary embodiment changes the first array data in each row among a plurality of rows that are simultaneously read (the rows A to F in FIG. 4). This can prevent the deterioration of image quality due to an incorrect count. The reason will be described below.

<Description of Principle and Effects>

Figure 9:
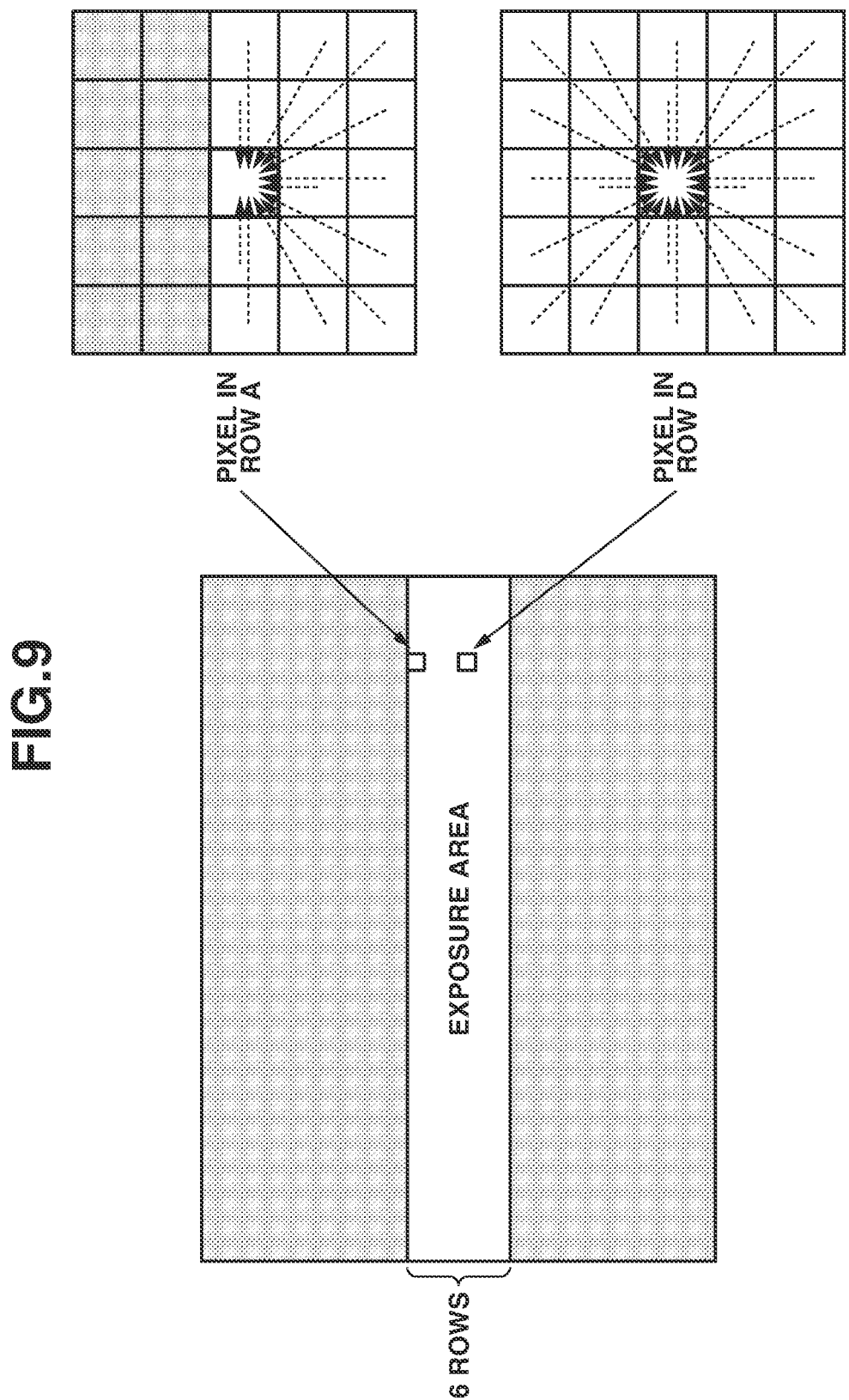
FIG. 9 illustrates light emission crosstalk while a plurality of rows is simultaneously read.
Figure 10:
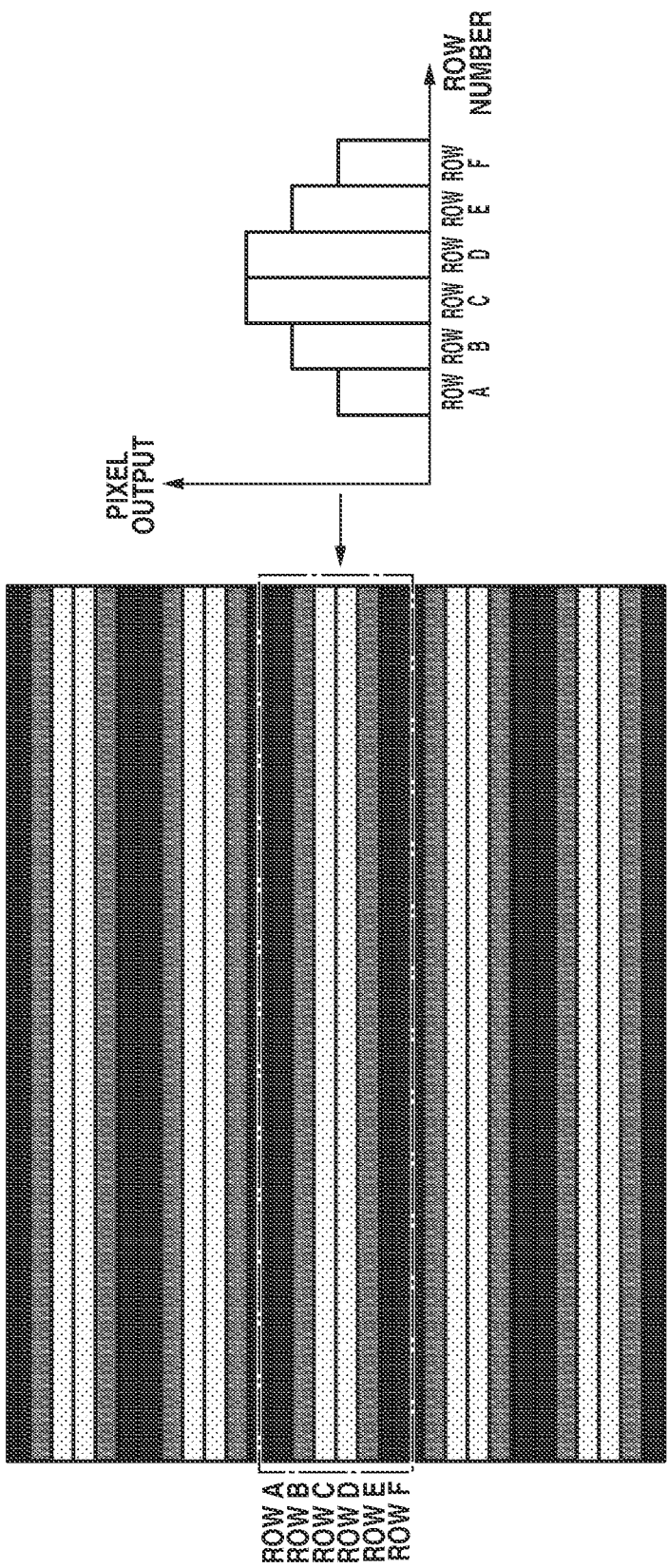
FIG. 10 illustrates deterioration of image quality due to an incorrect count that occurs due to light emission crosstalk.

The photoelectric conversion element according to the present exemplary embodiment simultaneously reads a plurality of rows as illustrated in FIG. 4. Thus, as illustrated in FIG. 9, the amount of light emission crosstalk received from surrounding pixels differs depending on the position in the plurality of rows that are simultaneously read. Specifically, each pixel in the row A receives only light emission crosstalk from pixels in the lower half, while each pixel in the row D receives light emission crosstalk from pixels above, below, to the left, and to the right of the pixel. Thus, if the brightness of an object is uniform, then as illustrated in FIG. 10, the brightness of the rows A and F is dark, and the brightness of the rows C and D is the brightest. Thus, horizontal streaks occur in an image, deteriorating the image quality due to the influence of light emission crosstalk.

To address this issue, the photoelectric conversion element according to the present exemplary embodiment changes the first array data (the correction information) indicating the probability of occurrence of an incorrect count between adjacent pixels among a plurality of rows that are simultaneously read. This reflects in the correction the differences in the influence of an incorrect count depending on the amount of light emission crosstalk among the plurality of rows that are simultaneously read. Specifically, in the first array data on the pixels located in the row A, as illustrated in FIG. 8A, the values of array elements in the upper half are set to zero. On the other hand, the first array data on the pixels located in the row D is set as illustrated in FIG. 8D. Similarly, regarding the rows B, C, E, and F, the values of elements of the array data are differentiated as illustrated in FIGS. 8B, 8C, 8E, and 8F, respectively, depending on the positions of pixels that are simultaneously read. This can prevent a decrease in the quality of an image due to an incorrect count.

<Flowchart>

Figure 11:
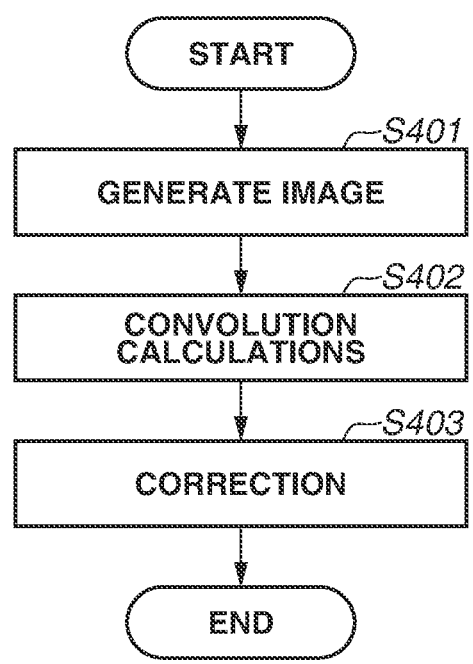
FIG. 11 is a flowchart of signal processing performed by the photoelectric conversion apparatus according to the first exemplary embodiment.
Figure 12:
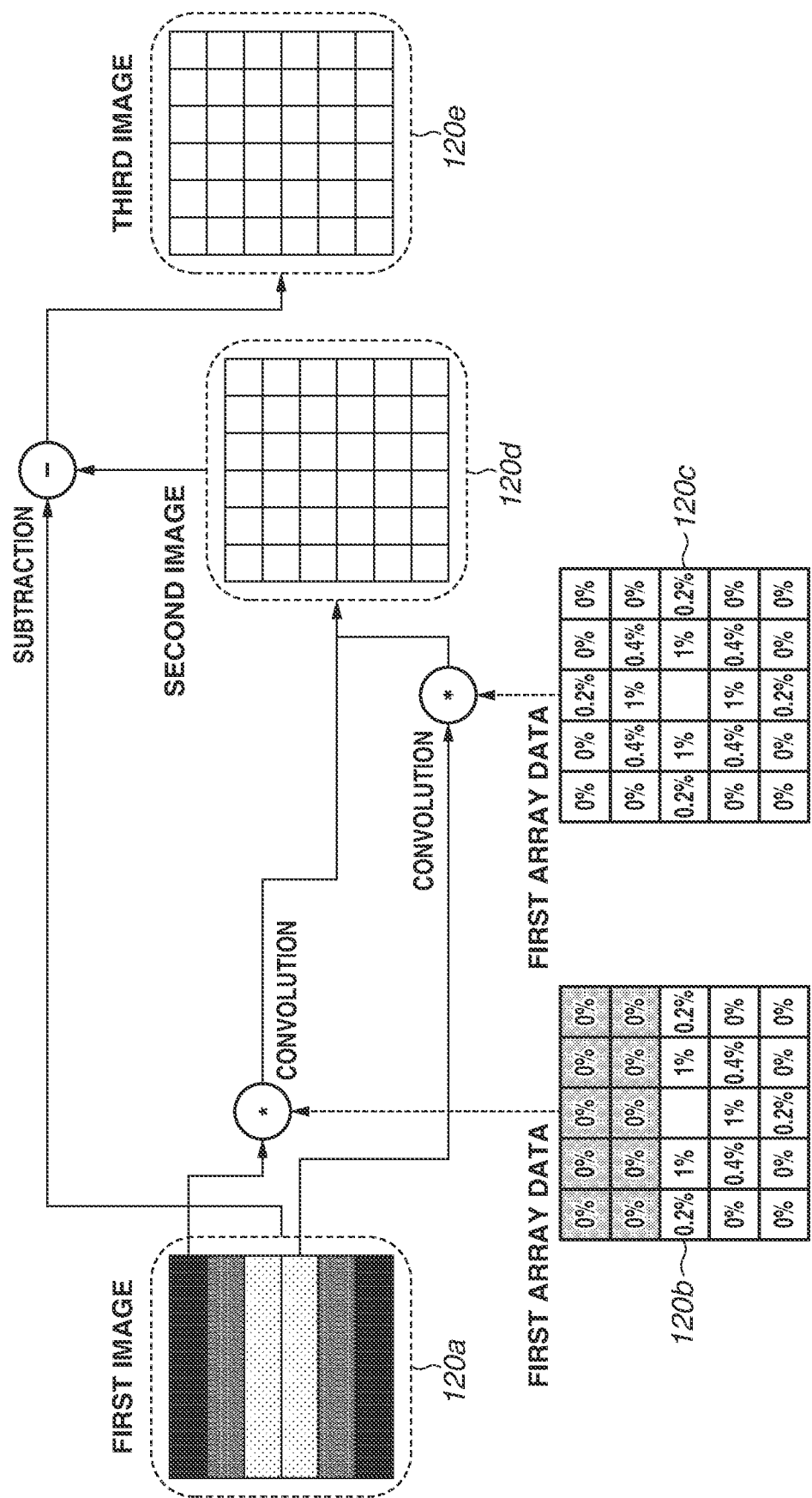
FIG. 12 illustrates examples of correction processes.

FIG. 11 illustrates a flowchart of signal processing. FIGS. 12A illustrates examples of correction processes. First, in step S401, the image generation unit 303 generates an image based on signals acquired from the photoelectric conversion element 100. In other words, the image generation unit 303 generates a first image in which signals acquired by the photoelectric conversion units 102 are arranged in a two-dimensional frame.

Next, in step S402, the correction processing unit 304 performs a correction process using the first array data on the first image, generating a second image. At this time, as illustrated in FIGS. 8A to 8F, the correction processing unit 304 changes the first array data used in the correction process among a plurality of rows that are simultaneously read. In other words, the first array data used in the correction process differs between the first and second pixel groups.

As described above, since the probability of occurrence of light emission crosstalk can be predicted, convolution calculations are performed, whereby the second image is signals indicating an incorrect count that occurs due to light emission crosstalk. The characteristic information (the first array data) may be acquired from the storage unit 305 or an external server. Alternatively, second array data may be stored as a table or functions in the storage unit 305. Step S402 functions as an acquisition step (an acquisition method) of acquiring the characteristic information regarding the photoelectric conversion element 100.

Then, in step S403, the correction processing unit 304 performs a correction process on the first image using the characteristic information regarding crosstalk between pixels in the photoelectric conversion element 100. That is, the correction processing unit 304 subtracts the second image from the first image, generating a third image. As described above, since the second image is signals indicating an incorrect count that occurs due to light emission crosstalk, the third image is an image that restores signals obtained in a case where the incorrect count due to light emission crosstalk does not occur. That is, the processes of steps S402 and S403 can reduce the influence of an incorrect count that occurs due to crosstalk.

FIG. 12A illustrates the first image 120a, the pieces of first array data 120b and 120c on the rows A and D, respectively, the second image 120d, and the third image 120e. Although the figures illustrate only the pieces of first array data used for the pixels in the rows A and D for simplicity, the convolution calculations are also performed on the pixels in the rows B, C, E, and F using the pieces of array data illustrated in FIGS. 8A to 8F. Instead of the convolution calculations, after the first image and the second array data are Fourier-transformed, the product of the Fourier-transformed first image and second array data may be obtained.

<Crosstalk Matrix>

The first array data obtained from the characteristic information illustrated in FIGS. 8A to 8F may be one-dimensional or two-dimensional as long as the first array data includes two or more pieces of data. It is, however, desirable that the first array data should be two-dimensional array data. Further, in view of the symmetry of the probability of crosstalk, it is desirable that the first array data should be a matrix in which the number of rows and the number of columns are both odd numbers, and should be left-right symmetric about the center. The closer to a scratch pixel the element is, the greater the value of the probability of crosstalk is. Thus, the first array data has a distribution that has a peak value in the center except for the scratch pixel and monotonically changes toward data ends. Specifically, if a single row of the first array data is extracted as one-dimensional data, the single row has a distribution that monotonically decreases from the center as a peak value toward both left and right ends.

It is desirable that the first array data should be up-down symmetric in a row in the center among a plurality of rows that are simultaneously read, and the higher and the lower the rows are, the less up-down symmetric the array data should be.

Specifically, it is desirable that the higher the row is, the smaller the value of an element on the upper side of the first array data should be. Then, it is desirable that the lower the row is, the smaller the value of an element on the lower side of the first array data should be. It is also desirable that the pieces of first array data should have an up-down symmetric relationship with each other between two rows away by the same distance in the up-down direction (the rows A and F, the rows B and E, and the rows C and D in the example of FIG. 4) from the row in the center (between the rows C and D in the example of FIG. 4) among the plurality of rows that are simultaneously read.

Further, a case is considered where the first array data has N rows. It is desirable that the values of the pieces of first array data should be equal to each other between a row below an (N−1)÷2-th row from the top (hereinafter referred to as an "upper boundary row") and a row above an (N−1)÷2-th row from the bottom (hereinafter referred to as a "lower boundary row") (the rows C and D in the example of FIG. 4; hereinafter each referred to as a "center row") among the plurality of rows that are simultaneously read. In the first array data used for the upper boundary row (the row B in FIG. 4), the value of an element in the top row is smaller than that in the first array data used for the center row. Then, it is desirable that in the first array data used for a row above the upper boundary row by M rows (the row A when M=1 in FIG. 4), the values of elements from the top to an M+1-th row be smaller than those in the first array data used for the center row. Similarly, in the first array data used for the lower boundary row (the row E in FIG. 4), the value of an element in the bottom row is smaller than that in the first array data used for the center row. Then, it is desirable that in the first array data used for a row below the lower boundary row by L rows (the row F when L=1 in FIG. 4), the values of elements from the bottom to an L+1-th row be smaller than those in the first array data used for the center row. It is understood that in fact, the above conditions are satisfied in the pieces of array data illustrated in FIGS. 8A to 8F.

While the description has been given above of array data in a case where pixel groups in a plurality of rows are simultaneously read in the row direction in the pixel area, array data in a case where a plurality of columns is simultaneously scanned in the column direction in the pixel area is also data having certain symmetry. The first array data in a case where the column direction is the scanning direction has a feature obtained by rotating the above first array data by 90 degrees. To sum up the above content, first, the characteristic information is array data in which the number of rows and the number of columns are both odd numbers, and has symmetry about the center. The reading circuit can simultaneously read signals of a plurality of pixel groups of one-dimensionally arranged pixels including the first pixel group (e.g., the first column of the pixel area) and the second pixel group (e.g., the second column of the pixel area) in the predetermined scanning direction. The predetermined scanning direction is the row direction or the column direction. The first array data (the correction information) is data extracted from the characteristic information so as to have symmetry about a pixel group in the center of the plurality of pixel rows (pixel groups) that are simultaneously read. Specifically, pixel groups in the row direction are up-down symmetric with respect to the center row, and pixel groups in the column direction are left-right symmetric with respect to the center column. Further, in the first array data (the correction information), the value of an element of the first array data corresponding to a pixel group away from the center is smaller than the value of an element of the first array data corresponding to a pixel group closer to the center among the plurality of pixel groups of one-dimensionally arranged pixels that are simultaneously read. Specifically, for example, when the first pixel group is an S+1-th column from the center and the second pixel group is an S-th column from the center, the value of an element of the first array data corresponding to the first pixel group is smaller than the value of an element of the first array data corresponding to the second pixel group. A case is considered where the predetermined scanning direction is the column direction in the pixel area and the first array data (the correction information) has T columns. A value of an element and a value of the corresponding element of the pieces of first array data between a column to the left of a (T−1)÷2-th column from the left and a column to the right of a (T−1)÷2-th column from the right among the plurality of pixel groups (columns) that are simultaneously read are equal to each other.

<Change in Array According to Exposure Time>

Figure 13A:
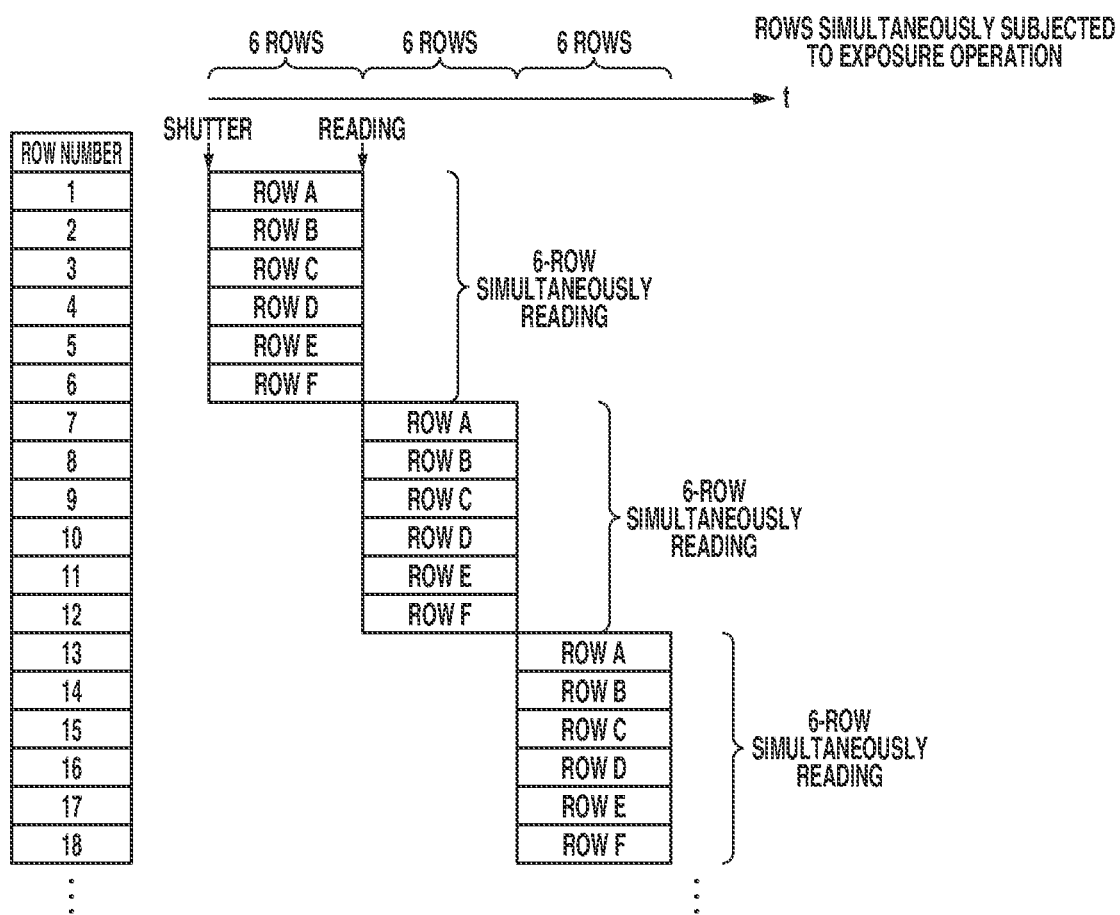

It is desirable to change the first array data according to the exposure time of the photoelectric conversion element 100. The reason is described below. FIG. 13A is a timing chart of the photoelectric conversion element with a short exposure time. FIG. 13B is a timing chart of the photoelectric conversion element with a long exposure time. FIGS. 13A and 13B also illustrate the number of rows simultaneously subjected to the exposure operation at each timing. In FIG. 13A, at all the timings, the number of rows simultaneously subjected to the exposure operation are six. That is, pixels other than the plurality of rows that are simultaneously read are not subjected to the exposure operation, which results in only the influence by light emission crosstalk from the pixels in the plurality of rows that are simultaneously read. On the other hand, in FIG. 13B, during the exposure operation, there are periods when pixels other than the plurality of rows that are simultaneously read are also subjected to the exposure operation, which means that the influence by light emission crosstalk from the pixels other than the plurality of rows that are simultaneously read is also included.

Thus, in the case of only the influence by light emission crosstalk from the pixels in the plurality of rows that are simultaneously read as illustrated in FIG. 13A, the following process is performed. That is, as illustrated in FIGS. 8A, 8B, 8E, and 8F, it is desirable to set the values of array elements (hatched portions) indicating the probability of light emission crosstalk from the pixels that are not simultaneously operating to zero.

Then, a longer exposure time causes more influence by light emission crosstalk from the pixels other than the plurality of rows that are simultaneously read. Thus, it is desirable to increase the values of the elements in the hatched portions in FIGS. 8A, 8B, 8E, and 8F. That is, it is desirable that the shorter the exposure time is, the greater the difference between the first array data used for the first row and the first array data used for the second row be. In other words, the shorter the exposure time is, the greater the difference between the correction information used for the first pixel group and the correction information used for the second pixel group is.

In the case of so-called full accumulation in which the exposure operation is performed during all the periods, the exposure operation is performed on all the pixels during all the periods. Thus, it is desirable to use the same first array data for all the rows. In other words, in a case where the exposure operation is performed during all the periods, it is desirable that the pieces of correction information be equal to each other between the first row (pixel group) and the second row (pixel group) in the correction processing means.

<Color Sensor>

The photoelectric conversion element 100 may be a monochrome sensor that does not include on-chip color filters, or may be a so-called color sensor including two or more types of pixels at least different in spectral characteristics. In the case of the color sensor, it is desirable to change a correction process for each color.

In the case of the color sensor, the probability of crosstalk does not differ between colors, but the signal level changes with respect to each different color pixel according to the color of the object. Thus, there is a color likely to be influenced by an incorrect count due to crosstalk. For example, in a case where the photoelectric conversion elements 100 is a color sensor having the RGGB Bayer arrangement, the luminance of a B pixel is the smallest and the luminance of a G pixel is the greatest in a general object. Thus, a B pixel is the most likely to be influenced by an incorrect count due to crosstalk, and a G pixel is the least likely to be influenced by an incorrect count due to crosstalk.

<Change in Size of Array with Respect to Each Color>

The greater the size of the array data used in the convolution calculation is, the lower influence of an incorrect count due to crosstalk can be. On the other hand, pixels are likely to be influenced by the difference in the probability of light emission crosstalk due to manufacturing variation caused by cluster scratches. Thus, the first array data should have the minimum size capable of reducing the influence of an incorrect count due to crosstalk. Thus, with the photoelectric conversion elements 100 being a color sensor having the RGGB Bayer arrangement, it is desirable that the size of the array data used in step S502 be greater in a B pixel than in a G pixel.

Figure 14:
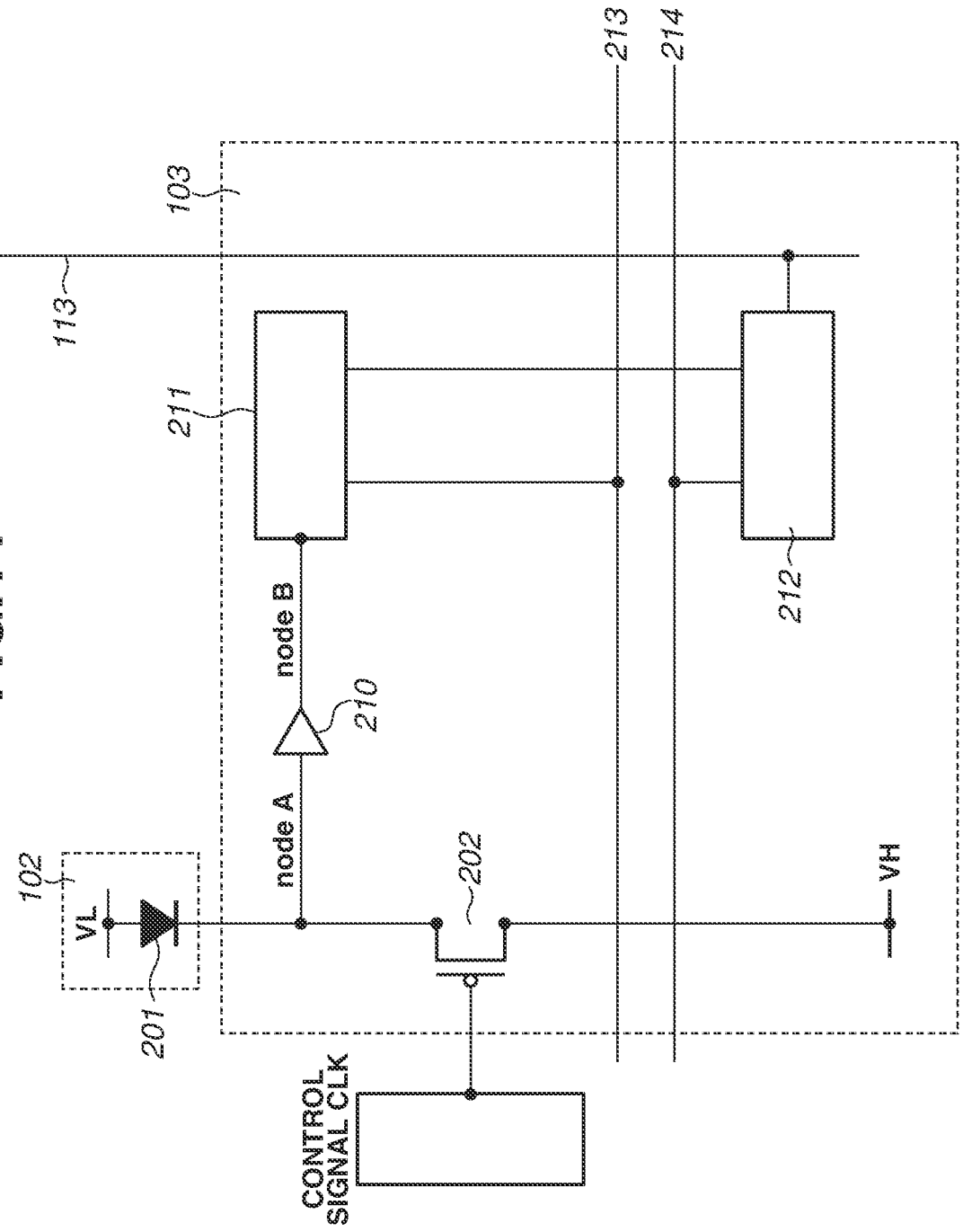
FIG. 14 illustrates an equivalent circuit corresponding to a pixel in a photoelectric conversion element according to a second exemplary embodiment.

A clock driving type according to a second exemplary embodiment will be described. A photoelectric conversion apparatus according to the second exemplary embodiment is different from that according to the first exemplary embodiment in the method for driving the photoelectric conversion element. Specifically, as illustrated in FIG. 14, a quench element 202 (hereinafter, referred to as a switch in some cases) is a metal-oxide-semiconductor (MOS) transistor, and the turning on and off of the quench element 202 are controlled by a control signal CLK connected to the gate of the quench element 202. The control signal CLK is controlled by a signal generation unit in the control pulse generation unit 115.

<Description of Clock Driving>

Figure 15:
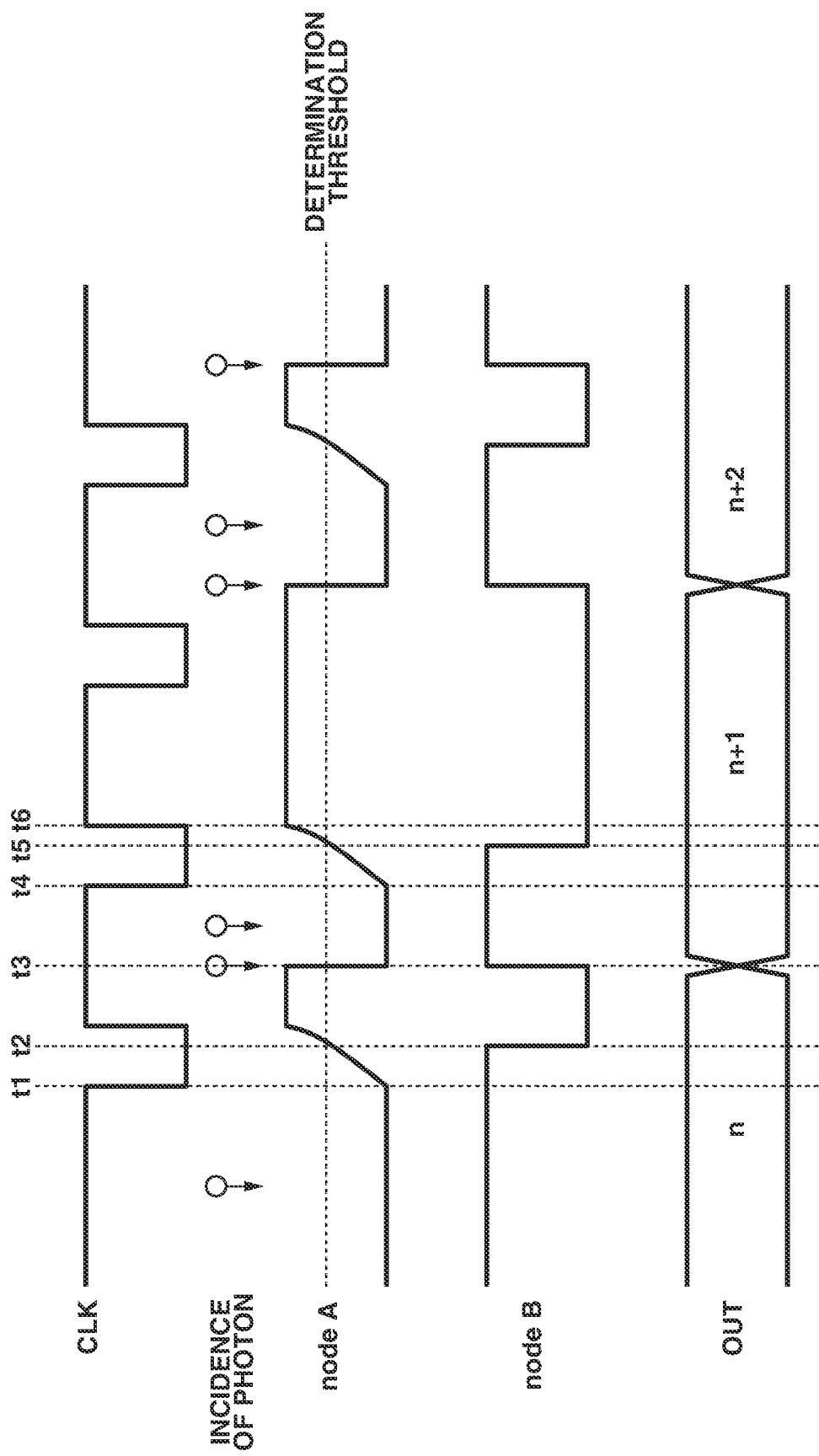
FIG. 15 is a timing chart of the photoelectric conversion element.

FIG. 15 schematically illustrates a relationship between the control signal CLK for the switch 202, the voltage of the node A, the voltage of the node B, and an output signal in the photoelectric conversion element illustrated in FIG. 14.

In the photoelectric conversion element according to the second exemplary embodiment, with the control signal CLK being at a high level, the driving voltage VH is less likely to be supplied to the APD 201. With the control signal CLK being at a low level, the driving voltage VH is supplied to the APD 201. The control signal CLK at the high level is 1 V, for example. The control signal CLK at the low level is 0 V, for example. With the control signal CLK being at the high level, the switch 202 is turned off. With the control signal CLK being at the low level, the switch 202 is turned on. The resistance value of the switch 202 with the control signal CLK being at the high level is higher than the resistance value of the switch 202 with the control signal CLK being at the low level. With the control signal CLK being at the high level, even if avalanche multiplication occurs in the APD 201, the recharge operation is less likely to be performed. Thus, the voltage supplied to the APD 201 is a voltage less than or equal to the breakdown voltage of the APD 201. As a result, the avalanche multiplication operation in the APD 201 stops.

At a time t1, the control signal CLK changes from the high level to the low level, the switch 202 is turned on, and the recharge operation of the APD 201 is started. Consequently, the voltage of the cathode of the APD 201 transitions to a high level. This makes it possible for the difference in voltage between the voltages applied to the anode and the cathode of the APD 201 to cause avalanche multiplication. The voltage of the cathode is the same as that of the node A. Thus, when the voltage of the cathode transitions from a low level to the high level, then at a time t2, the voltage of the node A becomes greater than or equal to a determination threshold. At this time, a pulse signal output from the node B is inverted and changes from a high level to a low level. If the recharge is completed, the difference in voltage between the driving voltages VH and VL is applied to the APD 201. Then, the control signal CLK changes to the high level, and the switch 202 is turned off.

Next, at a time t3, if a photon incidence on the APD 201 occurs, that causes avalanche multiplication in the APD 201, an avalanche multiplication current flows through the switch 202, and the voltage of the cathode drops. That is, the voltage of the node A drops. If the voltage of the node A becomes lower than the determination threshold during the drop of the voltage of the node A, the voltage of the node B changes from the low level to the high level. That is, the portion of the output waveform of the node A that exceeds the determination threshold is waveform-shaped by the waveform shaping unit 210 and output as a signal from the node B. Then, the signal is counted by the counter circuit 211, and the count value of a counter signal output from the counter circuit 211 increases by 1 least significant bit (LSB).

A photon incident on the APD 201 occurs between the t3 and a time t4. However, the switch 202 is in the off state, and the voltage applied to the APD 201 is not the difference in voltage that can cause avalanche multiplication. Thus, the voltage level of the node A does not exceed the determination threshold.

At the time t4, the control signal CLK changes from the high level to the low level, and the switch 202 is turned on. Accordingly, a current that compensates for the voltage drop flows through the node A from the driving voltage VL, and the voltage of the node A transitions to the original voltage level. At this time, at a time t5, the voltage of the node A becomes greater than or equal to the determination threshold. Thus, the pulse signal from the node B is inverted and changes from the high level to the low level.

At a time t6, the node A becomes static at the original voltage level, and the control signal CLK changes from the low level to the high level. After the time t6, the voltages of the nodes and the signal line also change according to the control signal CLK and photon incidences as described from the time t1 to the time t6.

As described above, the turning on and off of the switch 202 are switched by applying the control signal CLK to the switch 202, making it possible to control the recharge frequency of the APD 201. Without using the control signal CLK, an issue arises where the actual count value is smaller than the counted value corresponding to the luminance of incident light at a high luminance In this case, the turning on and off of the switch 202 are switched by applying the control signal CLK to the switch 202, eliminating the issue.

However, when the recharge frequency of the APD 201 is controlled by the control signal CLK, the relationship of the number of output signals to the number of input signals is not linear. If the influence of light emission crosstalk is ignored, it is possible to theoretically derive the relationship of the number of output signals to the number of input signals. Specifically, when the number of input signals is Nph, and the number of output signals is Nct, and the frequency of the control signal CLK (the inverse of the number of control signals CLK per unit time) is f, and the length of the exposure period is T, the relationship is expressed by the following formula 1.

$$Nct = fT\left(1 - e^{-\frac{Nph}{fT}}\right) \quad \text{[Math. 1]}$$

The photoelectric conversion apparatus according to the second exemplary embodiment performs correction processes capable of simultaneously reducing the influence of a non-linear response that occurs due to the control signal CLK and the influence of an incorrect count that occurs due to crosstalk. That is, the photoelectric conversion apparatus according to the second exemplary embodiment corrects the non-linearity of an image based on the number of pulse signals and the length of the exposure time. These processes will be described below.

<Flowchart>

Figure 16:
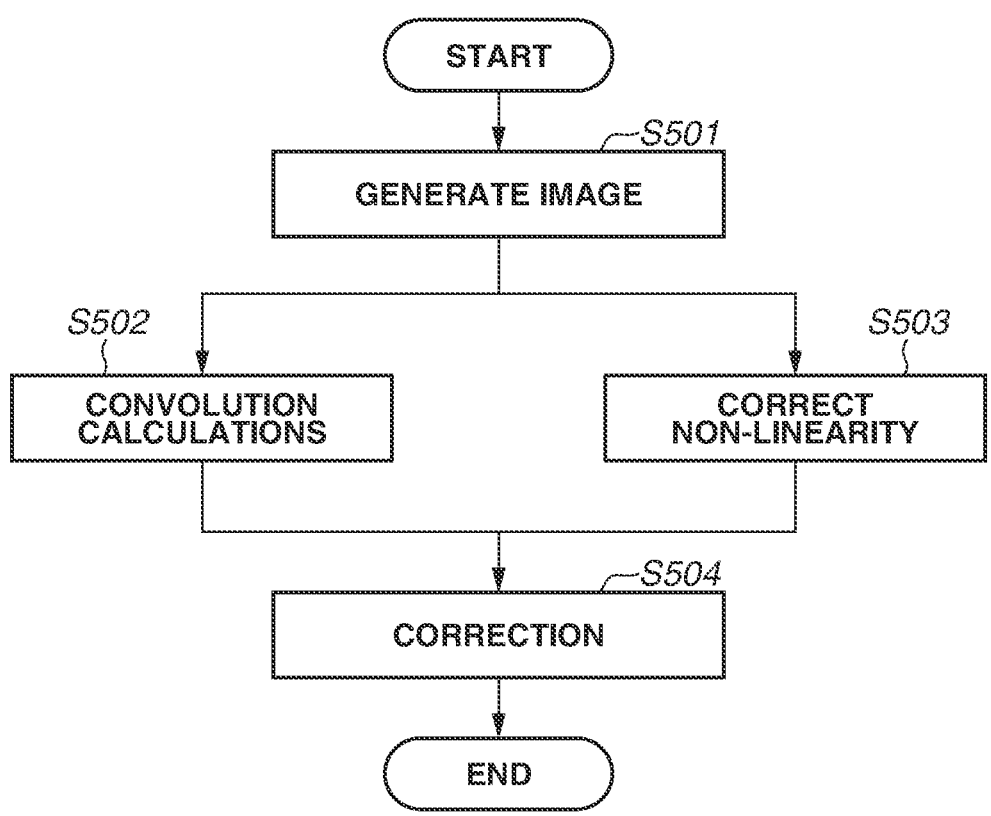
FIG. 16 is a flowchart of signal processing performed by a photoelectric conversion apparatus according to the second exemplary embodiment.

FIG. 16 is a flowchart of signal processing performed by the photoelectric conversion apparatus according to the second exemplary embodiment. The differences from the flowchart in FIG. 11 will be mainly described. First, similarly to FIG. 11, in step S501, the image generation unit 303 generates a first image.

Next, in step S502, similarly to step S402, the correction processing unit 304 performs a correction process using the first array data on the first image, generating a second image. At this time, the correction processing unit 304 changes the first array data used in the correction process among a plurality of rows that are simultaneously read.

In the photoelectric conversion apparatus according to the second exemplary embodiment, the processing branches to steps S502 and S503, and the correction processing unit 304 performs signal processing in step S503. In step S503, the correction processing unit 304 performs a non-linearity correction process for returning a non-linear response that occurs due to the control signal CLK to linear on the first image, generating a third image. In other words, the correction processing unit 304 corrects the non-linearity of the image based on the number of pulse signals and the length of the exposure time. Specifically, the correction processing unit 304 obtains the number of input signals Nph from the number of output signals Nct using the following formula 2.

$$Nph = -fT \times \ln\left(\frac{1 - Nct}{fT}\right) \quad \text{[Math. 2]}$$

Then, in step S504, the correction processing unit 304 subtracts the second image from the third image, generating a fourth image. As described above, since the second image is signals indicating an incorrect count that occurs due to light emission crosstalk, the fourth image is an image that restores signals obtained without an incorrect count due to light emission crosstalk that occurs. In other words, the processes of steps S503 to S505 can simultaneously reduce the influence of a non-linear response that occurs due to the control signal CLK and the influence of an incorrect count that occurs due to crosstalk.

Figure 17:
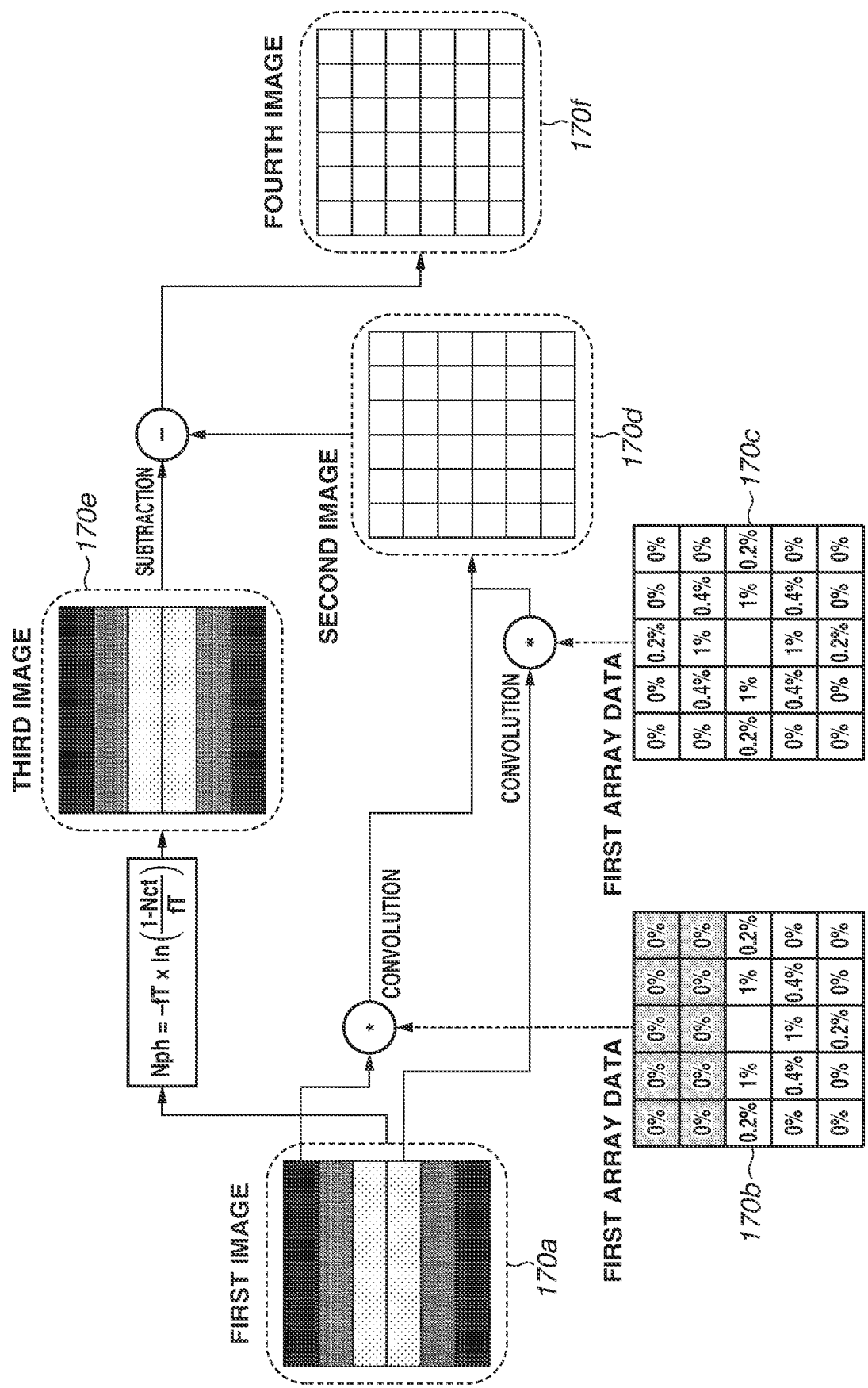
FIG. 17 illustrates examples of correction processes.

FIG. 17A illustrates the first image 170*a*, the pieces of first array data 170*b* and 170*c* on the rows A and D, respectively, the second image 170*d*, the third image 170*e*, and the fourth image 170*f*.

<Third Exemplary Embodiment: Photoelectric Conversion System>

Figure 18:
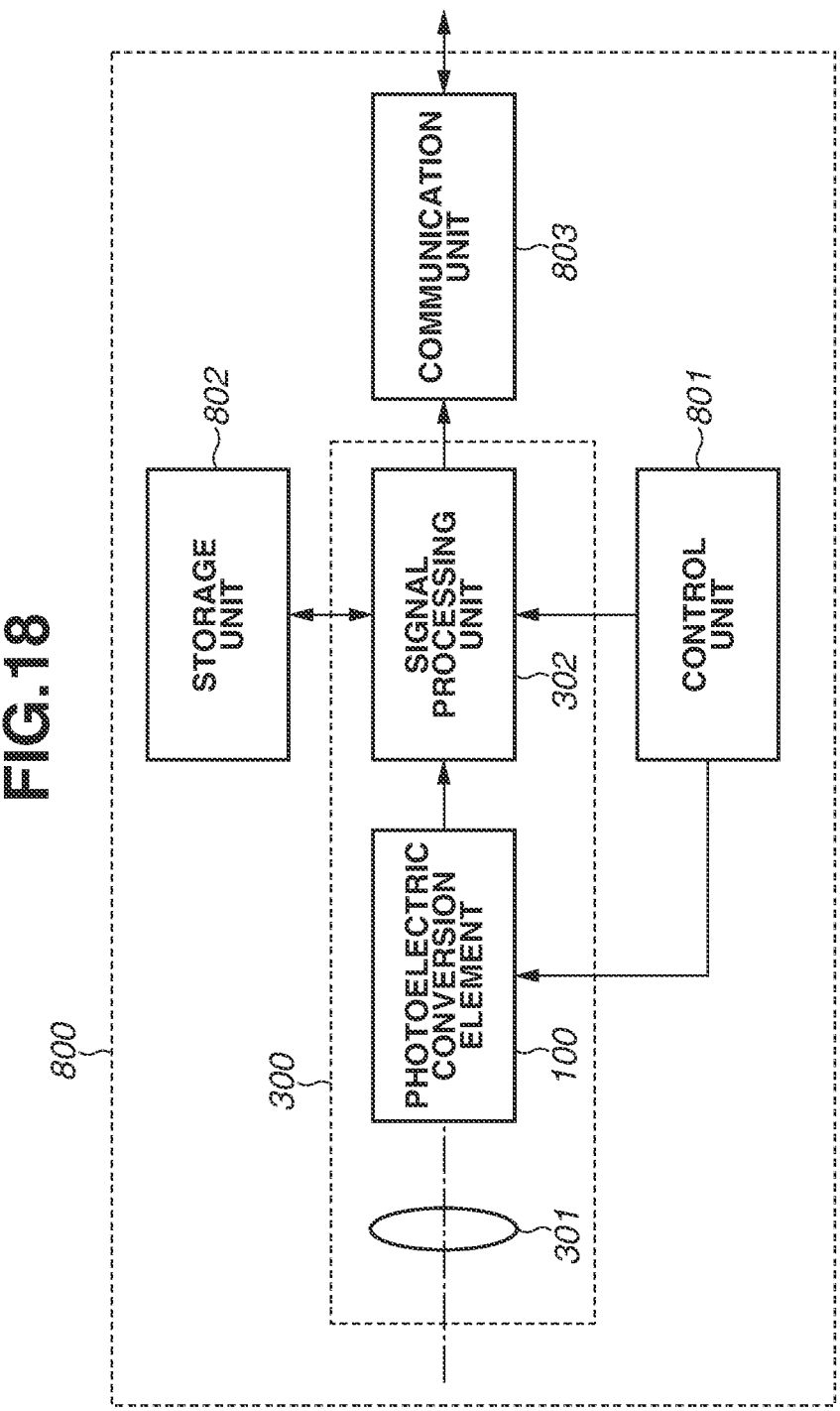
FIG. 18 illustrates an example of the functional configuration of a photoelectric conversion system.

FIG. 18 illustrates a system block diagram of a photoelectric conversion system according to a third exemplary embodiment using the photoelectric conversion apparatus according to the first and second exemplary embodiments. A photoelectric conversion system 800 includes the photoelectric conversion apparatus 300 including the photoelectric conversion element 100, a control unit 801, a storage unit 802, and a communication unit 803.

The photoelectric conversion element 100 captures an optical image formed by the image forming optical system 301. The signal processing unit 302 performs a black level correction process, a gamma curve adjustment process, a noise reduction process, and a data compression process, in addition to an image generation process and a correction process on signals read from the photoelectric conversion element 100, generating a final image. With the photoelectric conversion element 100 including red, green, and blue (RGB) on-chip color filters, it is more desirable to perform a white balance correction process and a color conversion process on the signals.

A central processing unit (CPU) as a computer is built into the control unit 801. The control unit 801 functions as control means that controls the operations of components of the entirety of the photoelectric conversion system 800 based on a computer program stored in a memory as a storage medium. The control unit 801 also controls the length of the exposure period and the timing of the control signal CLK in each frame of the photoelectric conversion element 100 via the control pulse generation unit 115 of the photoelectric conversion element 100.

The storage unit 802 includes a recording medium, such as a memory card or a hard disk. The communication unit 803 includes a wireless or wired interface. The communication unit 803 outputs a generated image to outside the photoelectric conversion system 800 and also receives signals from outside.

To carry out a part or all of the control according to the present exemplary embodiment, a computer program for carrying out the functions of the above exemplary embodiments may be supplied to a photoelectric conversion apparatus via a network or various storage media. Then, a computer (a CPU or a microprocessor unit (MPU)) of the photoelectric conversion apparatus may read and run the program. In this case, the program and a storage medium storing the program are included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc TM (BD)), a flash memory device, a memory card, and the like.

While the present invention has been described with reference to exemplary embodiments, it is to be understood that the invention is not limited to the disclosed exemplary embodiments, but is defined by the scope of the following claims.

What is claimed is:

1. A photoelectric conversion apparatus comprising:
a photoelectric conversion element including a pixel area where a plurality of pixels composed of avalanche photodiodes for photoelectrically converting an optical image is two-dimensionally arranged, the photoelectric conversion element being configured to read signals from a first pixel group and a second pixel group in the pixel area, where an exposure operation is performed simultaneously;
at least one processor; and
a memory coupled to the at least one processor, the memory storing instructions that, when executed by the at least one processor, cause the at least one processor to:
generate an image based on the read signals from both the first pixel group and the second pixel group;
acquire characteristic information regarding crosstalk between the plurality of pixels;
generate correction information based on the characteristic information; and
perform a correction process on the image using the correction information,
wherein correction information different between the first and second pixel groups is generated,
wherein the characteristic information differs depending on an exposure time of the photoelectric conversion element, and
wherein, in the correction process, in a case where the exposure operation is performed during all periods, the same characteristic information is used for the first and second pixel groups.

2. The photoelectric conversion apparatus according to claim 1, wherein the first and second pixel groups each are two or more pixels one-dimensionally placed in a row direction or a column direction.

3. The photoelectric conversion apparatus according to claim 2, wherein the characteristic information is array data in which the number of rows and the number of columns are both odd numbers, and has symmetry about a center.

4. The photoelectric conversion apparatus according to claim 2,
wherein the instructions cause the at least one processor to simultaneously read signals of a plurality of pixel groups of one-dimensionally arranged pixels including the first and second pixel groups in a predetermined scanning direction, and
wherein the correction information is data extracted from the characteristic information to have symmetry about a pixel group in a center of the plurality of pixel groups that are simultaneously read.

5. The photoelectric conversion apparatus according to claim 4, wherein in the correction information, a value of an element of the correction information corresponding to a pixel group away from the center is smaller than a value of an element of the correction information corresponding to a pixel group closer to the center among the plurality of pixel groups of one-dimensionally arranged pixels that are simultaneously read.

6. The photoelectric conversion apparatus according to claim 4, wherein in the correction information, in a case where the first and second pixel groups are two pixel groups away by the same distance from the center, a value of an element of the correction information corresponding to the first pixel group and a value of an element of the correction information corresponding to the second pixel group have a symmetric relationship with each other.

7. The photoelectric conversion apparatus according to claim 4, wherein in a case where the predetermined scanning direction is a row direction in the pixel area with the number of rows of the correction information being N, a value of an element and a value of a corresponding element of the pieces of correction information between a row below an (N−1)÷2-th row from a top and a row above an (N−1)÷2-th row from a bottom among the plurality of pixel groups that are simultaneously read are equal to each other.

8. The photoelectric conversion apparatus according to claim 1, wherein, in the correction process, the shorter the exposure time is, the greater a difference between the correction information used for the first pixel group and the correction information used for the second pixel group is.

9. The photoelectric conversion apparatus according to claim 1, wherein the correction process includes a process of performing a convolution calculation on the image with the correction information.

10. The photoelectric conversion apparatus according to claim 1, wherein the first and second pixel groups are different pixel groups adjacent to each other.

11. The photoelectric conversion apparatus according to claim 1, wherein the photoelectric conversion element includes two or more types of pixels at least different in spectral characteristics.

12. The photoelectric conversion apparatus according to claim 11, wherein in the characteristic information, a size of each pixel different in the spectral characteristics is changed.

13. A photoelectric conversion apparatus comprising:
a photoelectric conversion element including a pixel area where a plurality of pixels composed of avalanche photodiodes for photoelectrically converting an optical image is two-dimensionally arranged, the photoelectric conversion element being configured to read signals from a first pixel group and a second pixel group in the pixel area, where an exposure operation is performed simultaneously;
at least one processor; and
a memory coupled to the at least one processor, the memory storing instructions that, when executed by the at least one processor, cause the at least one processor to:
generate an image based on the read signals from both the first pixel group and the second pixel group;
acquire characteristic information regarding crosstalk between the plurality of pixels;
generate correction information based on the characteristic information; and
perform a correction process on the image using the correction information,
wherein correction information different between the first and second pixel groups is generated,
wherein the characteristic information is two-dimensional array data, and
wherein at least one piece of one-dimensional data corresponding to a scanning direction of the two-dimensional array data has a peak value, and the one-dimensional data has a distribution that monotonically decreases from the peak value.

14. A photoelectric conversion apparatus comprising:
a photoelectric conversion element including a pixel area where a plurality of pixels composed of avalanche photodiodes for photoelectrically converting an optical image is two-dimensionally arranged, the photoelectric conversion element being configured to read signals from a first pixel group and a second pixel group in the pixel area, where an exposure operation is performed simultaneously;
at least one processor; and
a memory coupled to the at least one processor, the memory storing instructions that, when executed by the at least one processor, cause the at least one processor to:
generate an image based on the read signals from both the first pixel group and the second pixel group;
acquire characteristic information regarding crosstalk between the plurality of pixels;
generate correction information based on the characteristic information; and
perform a correction process on the image using the correction information,
wherein correction information different between the first and second pixel groups is generated, and
wherein the photoelectric conversion element includes a switch connected to one node of an anode and a cathode of each of the avalanche photodiodes and a power supply line to which a driving voltage is applied, and configured to switch a resistance value between the one node and the power supply line, and a signal generation unit configured to generate a pulse signal for controlling the switching of the switch.

15. The photoelectric conversion apparatus according to claim 14, wherein in the correction process, the instructions cause the at least one processor to correct non-linearity of the image based on the number of the pulse signals and a length of an exposure time.

* * * * *